(12) United States Patent
Pieschel et al.

(10) Patent No.: US 9,819,286 B2
(45) Date of Patent: Nov. 14, 2017

(54) CONVERTER FOR OUTPUTTING REACTIVE POWER, AND METHOD FOR CONTROLLING SAID CONVERTER

(71) Applicant: SIEMENS AKTIENGESELLSCHAFT, Munich (DE)

(72) Inventors: Martin Pieschel, Nuremberg (DE); Christian Siegl, Altdorf (DE); Markus Wiesinger, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/318,061

(22) PCT Filed: Jun. 13, 2014

(86) PCT No.: PCT/EP2014/062410
§ 371 (c)(1),
(2) Date: Dec. 12, 2016

(87) PCT Pub. No.: WO2015/188877
PCT Pub. Date: Dec. 17, 2015

(65) Prior Publication Data
US 2017/0133949 A1  May 11, 2017

(51) Int. Cl.
*H02M 7/537* (2006.01)
*H02M 1/32* (2007.01)
(52) U.S. Cl.
CPC ............ *H02M 7/537* (2013.01); *H02M 1/32* (2013.01)
(58) Field of Classification Search
CPC . H02M 2001/0003; H02M 2001/0009; H02M 2007/4835; H02M 1/32;
(Continued)

(56) References Cited

U.S. PATENT DOCUMENTS 5,642,275 A    6/1997  Peng et al.
8,390,259 B2   3/2013  Dommaschk et al.
(Continued)

FOREIGN PATENT DOCUMENTS

EP    2541752 A1     1/2013
WO   2008086760 A1   7/2008
WO   2013087110 A1   6/2013

OTHER PUBLICATIONS

Qiang Song et al, "Multilevel Optimal Modulation and Dynamic Control Strategies for STATCOMs Using Cascaded Multilevel Inverters", IEEE Transactions on Power Delivery, IEEE Service Center, New York, NY, US, (Jul. 1, 2007), vol. 10, No. 3, ISSN 0885-8977, pp. 1937-1946, XP011186626 [Y] 1-15 *figures 1,2 *.

(Continued)

*Primary Examiner* — Emily P Pham
*Assistant Examiner* — Shahzeb K Ahmad
(74) *Attorney, Agent, or Firm* — Laurence Greenberg; Werner Stemer; Ralph Locher

(57) ABSTRACT

A converter outputs reactive power and has three phase branches connected to a phase of an alternating voltage source. Each of the phase branches has a phase module with a series circuit containing two-pole sub modules. A voltage which is dropped across each phase module corresponds to the sum of the voltages which are dropped across the sub modules. The first and the third phase branch are electrically connected to one another by a magnetically coupled throttle pair. A control device controls phase module currents. The control device contains current controllers which are associated with the phase modules, a decoupling unit for decoupling control differences by a computational during control of the phase module currents, a coupling unit for correcting the decoupled computational actuating variables in accordance with the magnetic coupling of the first throttle pair to (Continued)

obtain corrected actuating voltages, and a control unit for driving the sub modules.

12 Claims, 5 Drawing Sheets

(58) Field of Classification Search
CPC ........ H02M 5/40; H02M 5/4045; H02M 7/10; H02M 7/155; H02M 7/1552; H02M 7/162; H02M 7/1623; H02M 7/19; H02M 7/483; H02M 7/537
See application file for complete search history.

(56) References Cited

U.S. PATENT DOCUMENTS

| | | | |
|---|---|---|---|
| 2010/0020577 A1* | 1/2010 | Dommaschk | H02M 7/19 363/63 |
| 2010/0067266 A1* | 3/2010 | Dommaschk | H02M 7/483 363/64 |
| 2010/0118578 A1* | 5/2010 | Dommaschk | H02M 7/483 363/127 |
| 2012/0249113 A1* | 10/2012 | Winkelnkemper | H02M 5/297 323/311 |
| 2015/0069980 A1 | 3/2015 | Gambach et al. | |
| 2016/0172991 A1* | 6/2016 | Steimer | H02M 5/293 363/35 |

OTHER PUBLICATIONS

Hirofumi Akagi, "Classification, Terminology, and Application of the Modular Multilevel Cascade Converter (MMCC)", IEEE Transactions on Power Electronics, Institute of Electrical and Electronics Engineers, USA, (Nov. 1, 2011), vol. 26, No. 11, doi:10.1109/TPEL.2011.2143431, ISSN 0885-8993, pp. 3119-3130, XP011369856 [Y] 1-15 * figure 3 * * paragraph [00II] *.

Rainer Marquardt, "Modular Multilevel Converter topologies with DC-Short circuit current limitation", Power Electronics and ECCE Asia (ICPE&ECCE), 2011 IEEE 8th International Conference on, IEEE, (May 30, 2011), doi:10.1109/ICPE.2011.5944451, ISBN 978-1-61284-958-4, pp. 1425-1431, XP031956047 [A] 1-15 * paragraphs [000V], [00VI] *.

Makoto Hagiwara et al, "Negative-Sequence Reactive-Power Control by a PWM Statcom Based on a Modular Multilevel Cascade Converter (MMCC-SDBC)", IEEE Transactions on Industry Applications, IEEE Service Center, Piscataway, NJ, US, (Mar. 1, 2012), vol. 48, No. 2, doi:10.1109/TIA.2011.2182330, ISSN 0093-9994, pp. 720-729, XP011434198 [A] 1-15 * figures 3, 4 *.

M. Gommeringer, "Novel DC-AC Converter Topology for Multi-level Battery Energy Storage Systems", PCIM Europe 2013, May 14-16, 2013, Nuremberg.

* cited by examiner

CONVERTER FOR OUTPUTTING REACTIVE POWER, AND METHOD FOR CONTROLLING SAID CONVERTER

BACKGROUND OF THE INVENTION

Field of the Invention

The invention relates to a converter for reactive power compensation and to a control method for such a converter.

Converters of this type are known from the prior art. Document WO 2013/087110 A1, for example, shows a converter with three phase branches connected together in a delta circuit. Each phase branch comprises a connection point for connecting to a phase of a three-phase alternating voltage supply network that has been assigned to it. The phase branches here are each connected through coupling inductances to the assigned phases of the alternating voltage supply network. Each phase branch comprises a phase module with a series circuit of two-pole sub modules, wherein the sub modules are formed as so-called full-bridge circuits. Each sub module accordingly comprises two series circuits of power semiconductor switching units, connected in parallel with one another, wherein each power semiconductor switching unit comprises a power semiconductor that can be switched off as well as a diode connected with it in an antiparallel manner. Each sub module further comprises an energy store connected in parallel with the two series circuits in the form of a capacitor. Each sub module can be driven in such a way that a voltage is dropped across its poles which either corresponds to the voltage of the capacitor, the voltage of the capacitor but with inverse polarity, or a zero voltage, i.e. a voltage with the value zero. By means of suitable drive of the sub modules it is thus possible to generate a step-shaped alternating voltage at the phase modules of the converter. The height of the step here corresponds to the capacitor voltage. The known converter further comprises a control device for controlling the currents in the phase branches of the converter, so that a desired inductive reactive power can be made available in the alternating voltage supply network.

In the known converter, each phase branch in the delta circuit is in addition directly connected to a further phase of the alternating voltage supply network, i.e. without a coupling inductance. If the connected alternating voltage supply network is, for example, grounded with low resistance, for example via a star point transformer, then this can have the result that in the event of a contact with ground inside the converter, short-circuit currents flow that can have the result of permanent damage to converter components. Even in the case of an alternating voltage supply network that is grounded with high resistance, the short-circuit currents from flashovers (resulting, for example, from soiling or loose, conductive material) can arise between the phase branches.

BRIEF SUMMARY OF THE INVENTION

The object of the invention is to propose a converter of the type described above in which the risk of damage as a result of short-circuit currents in the event of short-circuits inside the converter is minimized.

The object is achieved by a converter which, according to the invention, comprises a first, a second and a third phase branch, wherein the three phase branches can each be connected to an associated phase of an alternating voltage supply network, and are delta-connected to one another, wherein each of the phase branches comprises a phase module with a series circuit of two-pole sub modules, wherein each sub module comprises an energy store and at least one power semiconductor, and can be driven in such a way that at least one positive or at least one negative sub module voltage, or a voltage with the value zero, is dropped across the poles of the sub module, and a voltage dropped across each phase module corresponds to the sum of the sub module voltages dropped across its sub modules, wherein the second and the third phase branches are connected to the phases of the alternating voltage supply network assigned to them by means of coupling inductances, and the first and the second phase branches are electrically connected together by a magnetically coupled first choke pair comprising a first and a second end connection as well as a center connection, wherein the three connections of the first choke pair are connected in an arbitrary combination with the first phase branch, the second phase branch and with the phase of the alternating voltage supply network that is assigned to the first phase branch, wherein furthermore a control device is provided for control of phase module currents, comprising current controllers assigned to the phase modules, a decoupling unit arranged upstream of the current controllers for computationally decoupling control differences during control of the phase module currents in respect of the mutual dependence of the phase module currents on account of the magnetic coupling in the first choke pair, in such a way that decoupled computer actuating variables can be derived from the decoupled control differences by means of the current controller, a coupling unit which is arranged downstream of the current controllers for correcting the decoupled computer actuating variables in accordance with the magnetic coupling of the first choke pair so as to obtain corrected actuating voltages, and a control unit for driving the sub modules, so that the voltages which are dropped across the phase modules can be adjusted in such a way that they correspond to the corrected actuating voltages.

In contrast to the known converter, the single coupling inductance arranged in the first phase branch is accordingly replaced by the first magnetically coupled choke pair that connects the first and the third phase branches electrically. Expressed otherwise, the coupling inductance forms the first choke pair together with a further inductance. The magnetic coupling between the two chokes of the first choke pair is taken into account in the control of the phase module currents by means of the proposed control device.

Through the proposed arrangement of the choke pair, the risk of short-circuit currents in the converter can advantageously be minimized. If a short-circuit occurs in the third phase branch with respect to the ground potential, the current will in any case be limited by the choke pair and the coupling inductance in the third phase branch. A direct connection between one phase of the alternating voltage supply network and the ground contact point, i.e. a current path that does not pass through any current-limiting inductances, is thus prevented. In this way damage to the components of the converter can be prevented.

The magnetically coupled choke pair can, for example, be realized in the form of two choke coils arranged spatially next to one another. The choke coils can be air-cored coils, but they can also comprise a common ferromagnetic core. The choke pair comprises three connections: a first and a second end connection as well as a center connection.

The center connection here is arranged at an electrical connection of the two choke coils. The three connections of the choke pair are assigned in any desired way to the first phase branch, the second phase branch and the phase of the alternating voltage supply network. For example, the center connection can be connected to the phase of the alternating voltage supply network that is assigned to the first phase branch, while the first end connection is connected to the first phase branch and the second end connection to the second phase branch. The two chokes of the choke pair can have a construction that is the same, but they can also have different constructions, for example they can comprise different numbers of windings.

The compact construction enabled by the magnetically coupled choke pair, or the spatial proximity of the two chokes of the choke pair, requires a comparatively small footprint, which reduces the cost of the converter as a whole.

A coupling of the currents in the phase branches results from the magnetic coupling between the two chokes of the first choke pair. In order to ensure a controlled acceptance of reactive power or output of reactive power, this dependence must be taken into account in the control of the phase module currents. According to a mathematical model of the control, the mesh and node equations in the converter yield the transformations between a computationally decoupled mathematical control system, including the associated equations, and a coupled mathematical control system. Appropriately, a system of equations in particular results, with coefficients that correspond to the magnetic coupling constants of the magnetic coupling in the choke pair and on the inductance values of the chokes and coupling inductances. In this connection, the decoupling unit is provided to computationally decouple from the mutually coupled control differences (since the system of equations is linear, the transformations can also be applied to the set point currents and the actual currents), i.e. to convert them into the mathematically decoupled system of currents. The decoupled control differences are supplied to the current controllers, which determine computer actuating variables from the control differences. The computer actuating variables can accordingly not be used to control the phase module currents, since they only represent an intermediate computational step. These actuating variables must be corrected in the next step in accordance with the magnetic couplings, in order to obtain the true actuating variables which are referred to as corrected actuating voltages. The mathematical transformations belonging to this emerge again from the state equations of the currents in the converter. The correction of the computer actuating variables is performed by the coupling unit. The corrected actuating voltages are appropriately first supplied to the control unit, which generates from them the control signals for the individual sub modules of the phase modules.

According to an advantageous form of embodiment of the invention, a second magnetically coupled choke pair is provided, formed from the coupling inductance assigned to the second phase branch and from a further inductance, and connects the first and the second phase branches together, wherein the second choke pair has a first and a second end connection and a center connection, wherein the three connections of the second choke pair are joined in an arbitrary combination with the first phase branch, the second phase branch, or with the phase of the alternating voltage supply network that is assigned to the second phase branch. A third magnetically coupled choke pair is furthermore provided, formed from the coupling inductance assigned to the third phase branch and from an additional inductance, and connects the second and the third phase branches together, wherein the third choke pair has a first and a second end connection and a center connection, wherein the three connections of the third choke pair are joined in an arbitrary combination with the second phase branch, the third phase branch, or with the phase of the alternating voltage supply network that is assigned to the third phase branch. The decoupling unit is here additionally configured to computationally decouple the control differences in respect of the mutual dependence of the phase module currents resulting from the magnetic coupling in the second and third choke pairs, wherein the coupling unit is configured for correction of the decoupled computer actuating variables obtained by means of the current controller from the decoupled control differences in accordance with the magnetic coupling in the first, second and third choke pairs so as to obtain the corrected actuating voltages.

In other words, the first and the second phase branches are thus also connected together by a magnetically coupled second choke pair, so that the individual coupling inductance in the second phase branch constitutes one of the chokes of the second choke pair. The second and the third phase branches are also connected together by a magnetically coupled third choke pair, so that the individual coupling inductance in the third phase branch constitutes one of the chokes of the third choke pair.

In this way all the dependencies between the currents resulting from the magnetic coupling between the chokes of the three choke pairs are taken into account in the control of the phase module currents in the three phase branches of the converter. Controlled operation of the converter would not be possible without taking these dependencies into account.

The minimization of the damage from short-circuit currents in all three phase modules of the converter is particularly advantageous in this form of embodiment, since each short-circuit current is limited by at least two inductances of the choke pairs.

The sub modules are preferably constructed as full-bridge circuits, wherein the power semiconductor switches of the sub modules are, for example, bipolar transistors with insulated gate electrodes (IGBT) or metal oxide semiconductor field-effect transistors (MOSFET). In this case, the sub module voltages correspond to the energy storage voltages dropped across the energy stores of the sub modules.

It is, however, also possible for the sub modules to be designed differently, in order to match the converter better to the particular application. Sub modules are also possible in this connection that have a structure that differs from a full bridge. In particular, sub modules can be used at the poles of which a plurality of positive and/or a plurality of negative voltage values of the sub module voltage can be set through appropriate drive, for example a first and a second positive and/or a first and a second negative voltage value. Examples of such sub modules are described in the article "Novel DC-AC Converter Topology for Multilevel Battery Energy Storage Systems" by M. Gommeringer et. al, PCIM Europe 2013. The voltage dropped across the phase module corresponds to the total of the sub module voltages set at the sub modules.

Preferably the energy stores of the sub modules are storage capacitors, particularly preferably high-performance storage capacitors, in order to satisfy better the high requirements of the high-voltage application.

According to an advantageous form of embodiment of the invention, the control device further comprises a control unit connected to the decoupling unit for driving the sub modules by means of pulse-width modulation (PWM). Any appropriate PWM method, or the method known from the document WO 2008/086760 A1, can be used as the control method. The control unit can be implemented in the form of so-called Module Management Systems (MMS), wherein each of the three phase modules is assigned to one MMS.

Preferably the converter comprises measuring apparatus such as voltage and/or current transducers for detecting the phase module currents and the connection voltages. The current transducers can, for example, be arranged in one or a plurality of the phase branches. Capacitive voltage transducers can, furthermore, also be provided in order to measure the connection voltages.

According to a further preferred form of embodiment, the control device of the converter further comprises a signal processing unit with at least one mean value generator, at least one difference generator, at least one voltage controller, at least one frequency generator and at least one adder. The signal processing unit of the mean value generator is here configured to generate a mean value of the energy store voltages of the assigned phase module, wherein the difference generator is connected on the input side to an output of the mean value generator, and is configured to generate a control difference from the mean value of the energy store voltages and a predetermined DC voltage set point value; the voltage regulator is connected on the input side to an output of the difference generator, and is configured to generate a real set point current value from the control difference; the frequency generator is connected on the input side to an output of the voltage controller, and is configured to generate a sinusoidal real set point current from the real set point current value, and the adder is connected on the input side to an output of the frequency generator, and is configured to generate the set point current for the assigned phase module from the real set point current and a predetermined reactive set point current.

The (alternating) set point current for each phase module is thus composed of two components: the real set point current and the reactive set point current. The intake of a real power by the converter serves here to compensate for an unwanted voltage drop in the energy stores of the sub modules. The voltage controller can, for example, be a suitable linear controller.

The signal processing unit is preferably part of a digital data processing installation. If the individual energy stores of the sub modules are of different designs, the energy store voltages can also be compared with different assigned DC voltage set point values, in order to control the energy intake. It is also possible to replace the simple mean value generation in the mean value generator by a calculation adapted according to the sub modules being used, for example a weighted mean value generation.

The frequency generator creates an alternating current magnitude from the predetermined DC voltage set point value which is constant or which changes slowly over time, the phase angle of which is equal to the phase angle of the voltage in the alternating voltage supply network. The outputs of the signal processing units are appropriately connected in each case to the input of a current controller of the assigned phase module.

It is a further object of the invention to propose a control method for the converter described above which enables controlled output of reactive power.

The object is achieved by a control method in which, according to the invention, a set point current is predetermined for each phase module, control differences that are formed from the predetermined set point currents and the measured phase module currents, are computationally decoupled with reference to the mutual dependence of the phase module currents on account of the magnetic coupling in the first choke pair by means of a decoupling unit, so that current controllers assigned to the phase modules and arranged downstream of the decoupling unit each derive decoupled computer actuating variables from the decoupled control differences, and the decoupled computer actuating variables are corrected by means of a coupling unit arranged downstream from the current controllers in accordance with the magnetic coupling of the first choke pair to obtain corrected actuating voltages, wherein the sub modules of the phase modules are driven by means of a control unit in such a way that the voltages dropped across the phase modules correspond to the corrected actuating voltages.

A controlled operation of the converter according to the invention can be ensured by means of the proposed control according to the invention, so that reactive current compensation is possible in the connected alternating voltage supply network.

A preferred form of embodiment of the control method can particularly be applied to a converter in which a second magnetically coupled choke pair is provided, formed from the coupling inductance assigned to the second phase branch and from a further inductance, and connects the first and the second phase branches together, wherein the second choke pair has a first and a second end connection and a center connection, wherein the three connections of the second choke pair are joined in an arbitrary combination with the first phase branch, the second phase branch, or with the phase of the alternating voltage supply network that is assigned to the second phase branch, and a third magnetically coupled choke pair is provided, formed from the coupling inductance assigned to the third phase branch and from an additional inductance, and connects the second and the third phase branches together, wherein the third choke pair has a first and a second end connection and a center connection, wherein the three connections of the third choke pair are joined in an arbitrary combination with the second phase branch, the third phase branch, or with the phase of the alternating voltage supply network that is assigned to the third phase branch, wherein the control differences are computationally decoupled with reference to the mutual dependence of the phase module currents on account of the magnetic coupling in the first, second and third choke pairs by means of the decoupling unit, so that current controllers assigned to the phase modules and arranged downstream of the decoupling unit each derive decoupled computer actuating variables from the decoupled control differences, and the decoupled computer actuating variables are corrected by means of a coupling unit arranged downstream from the current controllers in accordance with the magnetic coupling of the first, second and third choke pairs to obtain corrected actuating voltages. The coupling inductances in the second and third phase branches are accordingly here included in the magnetically coupled second and third choke pairs. In this way the risk of short-circuit currents is minimized in all phase branches of the converter.

Preferably the corrected actuating voltages each have a disturbing voltage impressed upon them, wherein the disturbing voltages are determined depending on connection voltages dropped across the phase branches, and the corrected actuating voltages onto which the disturbing voltages have been impressed are supplied to the control unit. The disturbing voltages are determined by means of suitable measuring equipment. They correspond to the voltages that are driven into the individual phase branches of the converter by the currents from the alternating voltage supply network. For that reason, the disturbing voltages, according to the definition used here, have the opposite arithmetic sign to the voltages at the phase modules of the converter.

Preferably the actuating voltages are converted by means of pulse-width modulation (PWM) into control signals for driving the assigned sub modules.

According to a further preferred form of embodiment of the control method, the set point currents are each composed of a real set point current and a reactive set point current, wherein the real set point currents are determined depending on a mean value of the voltages dropped across the sub modules of the associated phase module and of a predetermined DC voltage set point value.

The invention is explained below in relation to exemplary embodiments of the converter according to the invention illustrated in FIGS. 1-6.

DESCRIPTION OF THE INVENTION

Figure 1:
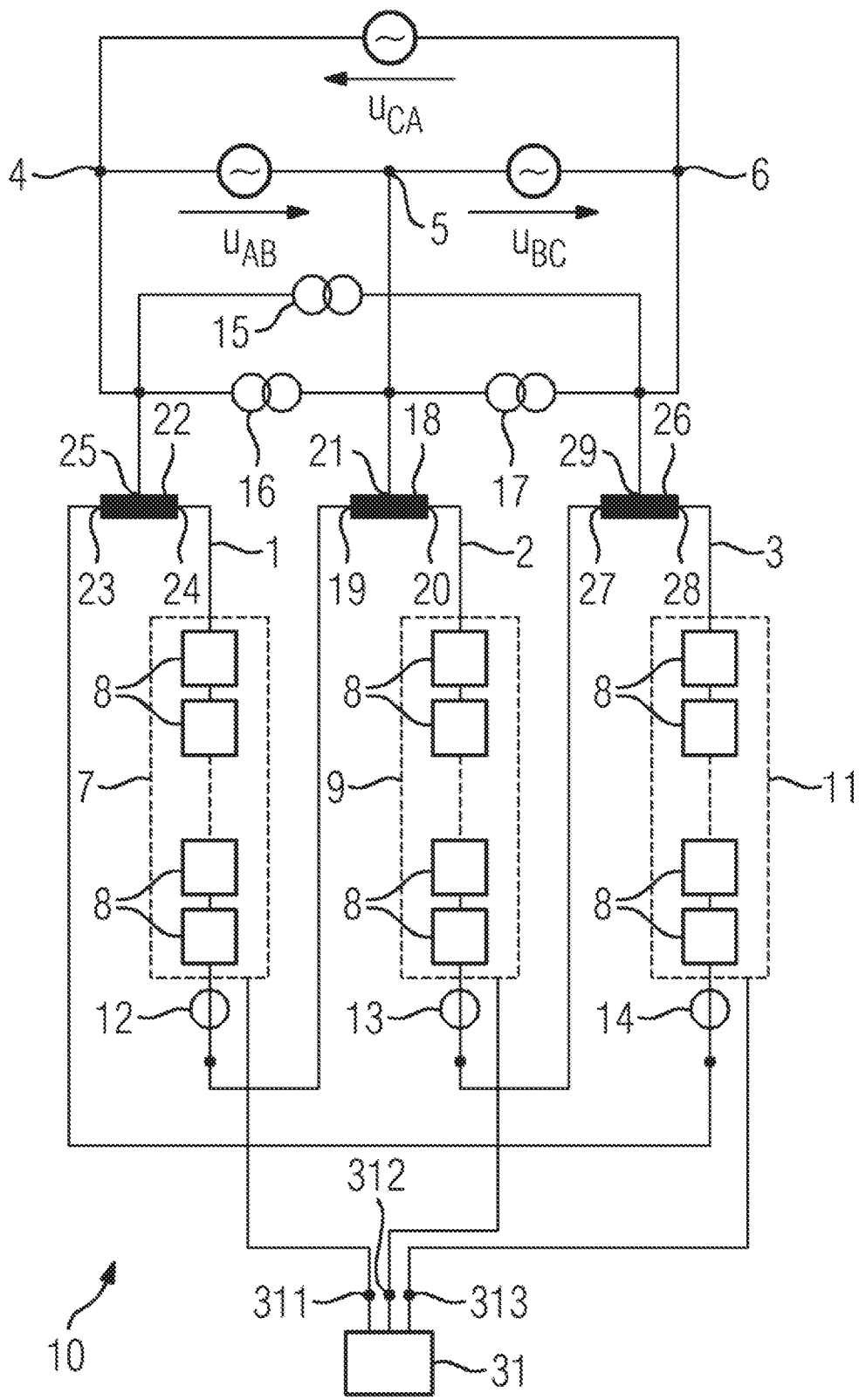
FIG. 1 shows a schematic representation of a first exemplary embodiment of a converter according to the invention.

In detail, an exemplary embodiment of a converter 10 according to the invention is illustrated in FIG. 1. The converter 10 comprises a first phase branch 1, a second phase branch 2 and a third phase branch 3. The first phase branch 1 comprises a connection point 4 for connecting to an alternating voltage supply network. The alternating voltage supply network is not illustrated graphically in FIG. 1. Accordingly, the phase branches 2 and 3 each comprise the connection points 5 and 6, which connect each of the phase branches 2, 3 to the phases of the alternating voltage supply network assigned to them.

The first phase branch 1 comprises a phase module 7. The phase module 7 comprises a series circuit of sub modules 8. In general, the phase module 7 comprises an arbitrary number of phase modules 8, where in FIG. 1 only four sub modules 8 are illustrated graphically. The number m of sub modules 8 depends on the voltages to be generated in the sub module 7. The phase branches 2, 3 also comprise phase modules 9, 11 respectively. The phase modules 9, 11 also each comprise a series circuit of sub modules 8. In the exemplary embodiment of the converter 10 illustrated in FIG. 1, the phase modules 7, 9, 11 comprise the same number of sub modules 8. It is, however, also possible that the number of sub modules 8 in the phase modules of the individual phase branches 1, 2, 3 is different. In the exemplary embodiment of the converter 10 illustrated, the sub modules 8 have the same construction. Here again it is possible for the sub modules 8 to be of different designs.

The phase module currents are measured by means of measuring apparatus 12, 13, 14.

The voltages between the connection points 4, 5, 6, which are identified in FIG. 1 with UAB, UBC and UCA respectively, are measured by means of suitable measuring apparatus such as voltage transducers 15, 16 and 17.

The first phase branch 1 and the third phase branch 3 are connected together by a magnetically coupled first choke pair 22, which comprises end connections 23 and 24 along with a center connection 25. The end connection 23 is connected to the third phase branch 3, and the second end connection 24 to the first phase branch 1. The center connection 25 of the choke pair 22 is connected to the connection point 4 and, through that, to the phase of the alternating voltage supply network that is assigned to the first phase branch 1.

The first phase branch 1 and the second phase branch 2 are connected to one another by a magnetically coupled second choke pair 18. The second choke pair 18 has two end connections 19 and 20 respectively, wherein the end connection 19 is connected to the first phase branch 1, and the second end connection 20 is connected to the second phase branch 2. The second choke pair 18 further has a center connection 21, which can be connected to the phase of the alternating voltage supply network assigned to the second phase branch 2.

The second and the third phase branches 2, 3 are furthermore connected through a third choke pair 26. The magnetically coupled third choke pair 26 has end terminals 27 and 28 and a center connection 29. The connection 27 is here to be connected to the second phase branch 2, the connection 28 to the third phase branch 3, and the connection 29 to the connection point 6 to the phase of the alternating voltage supply network assigned to the third phase branch.

The converter 10 further comprises a control device 31 only shown here schematically, which is configured to control the phase module currents by means of control outputs 311, control outputs 312 and control outputs 313.

Figure 2:
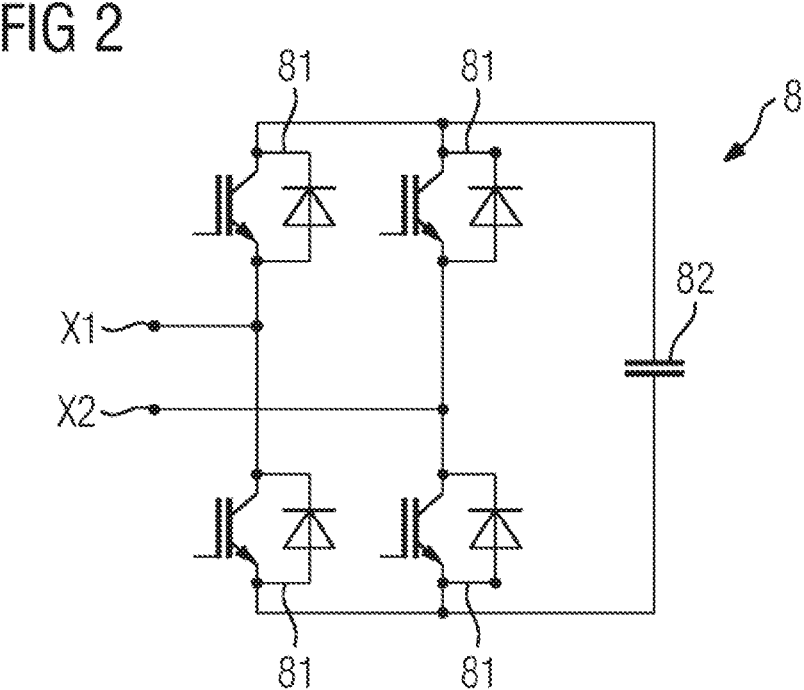
FIG. 2 shows a schematic representation of an exemplary embodiment of a sub module of the converter according to the invention.

The construction of the sub module 8 is considered in more detail in FIG. 2. The sub module 8 is constructed as a two-terminal network, wherein the two poles of the sub module 8 are identified in FIG. 2 with X1 and X2. The sub module 8 of FIG. 2 is designed as a so-called full-bridge circuit or H-bridge circuit. It comprises two series circuits of power semiconductor switching units 81, each of which consists of a parallel interconnection of a power semiconductor switch that can be switched off and of a diode connected with it in antiparallel. The sub module 8 further comprises an energy store 82, which is implemented in the exemplary embodiment illustrated in FIG. 2 as a storage capacitor. The storage capacitor here is connected in parallel with the two series circuits with the power semiconductor switching units 81. Through suitable drive of the sub modules via the control outputs 311, 312, 313 of the control device 31, which is not illustrated in FIG. 2, the sub modules 8 can each be driven in such a way that a sub module voltage is dropped at the two terminals X1 and X2 of the sub modules which is equal to the voltage dropped across the capacitor 82, the voltage across the capacitor 82 but with the inverse polarity, or to a voltage with the value zero. With this, in a temporal sequence, a voltage curve can be generated at each of the phase modules 7, 8, 9, which corresponds to a stepped alternating voltage.

Figure 3:
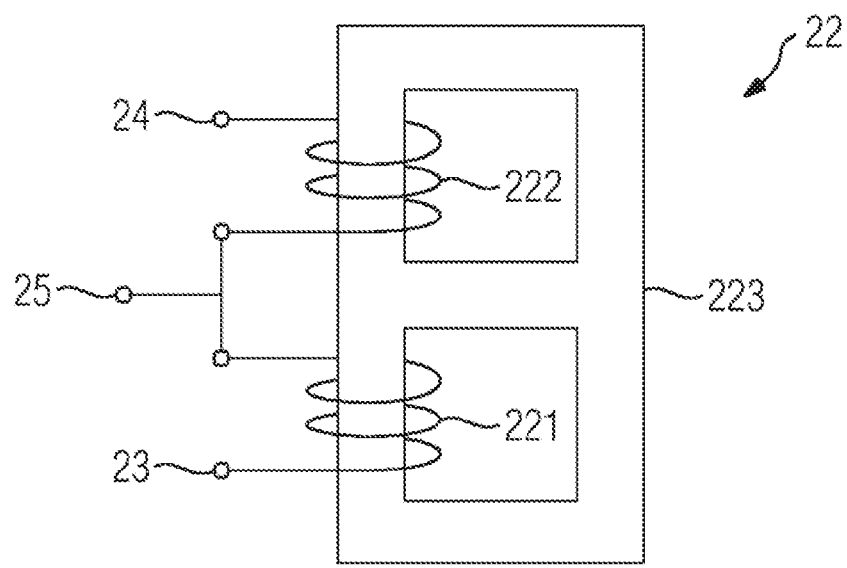
FIG. 3 shows a schematic representation of an exemplary embodiment of a magnetically coupled choke pair.

FIG. 3 shows a schematic illustration of one of the magnetically coupled choke pairs 18, 22, 26 of the converter 10 of FIG. 1. In detail, the first choke pair 22 is illustrated in FIG. 3. In the exemplary embodiment of the converter 10 shown here, the second and third choke pairs 18 and 26 have the same construction as the choke pair 22. It is also, however, possible for the choke pairs 22, 18, 26 to be of different designs. The magnetically coupled first choke pair 22 comprises a first end connection 23, a second end connection 24 and a center connection 25. The choke pair 22 further comprises a first choke 221 along with a second choke 222. The two chokes 221 and 222 are arranged in close spatial proximity to one another. In this way a magnetic coupling arises between the two chokes 221, 222, and is not to be neglected in the control of the converter 10 of FIG. 1, in contrast to chokes that are not coupled. The two chokes 221, 222 are wound around a common core 223 that is manufactured of a ferromagnetic material. It should be pointed out in this connection, that air coupling of the two chokes 221, 223 is also possible.

Figure 4:
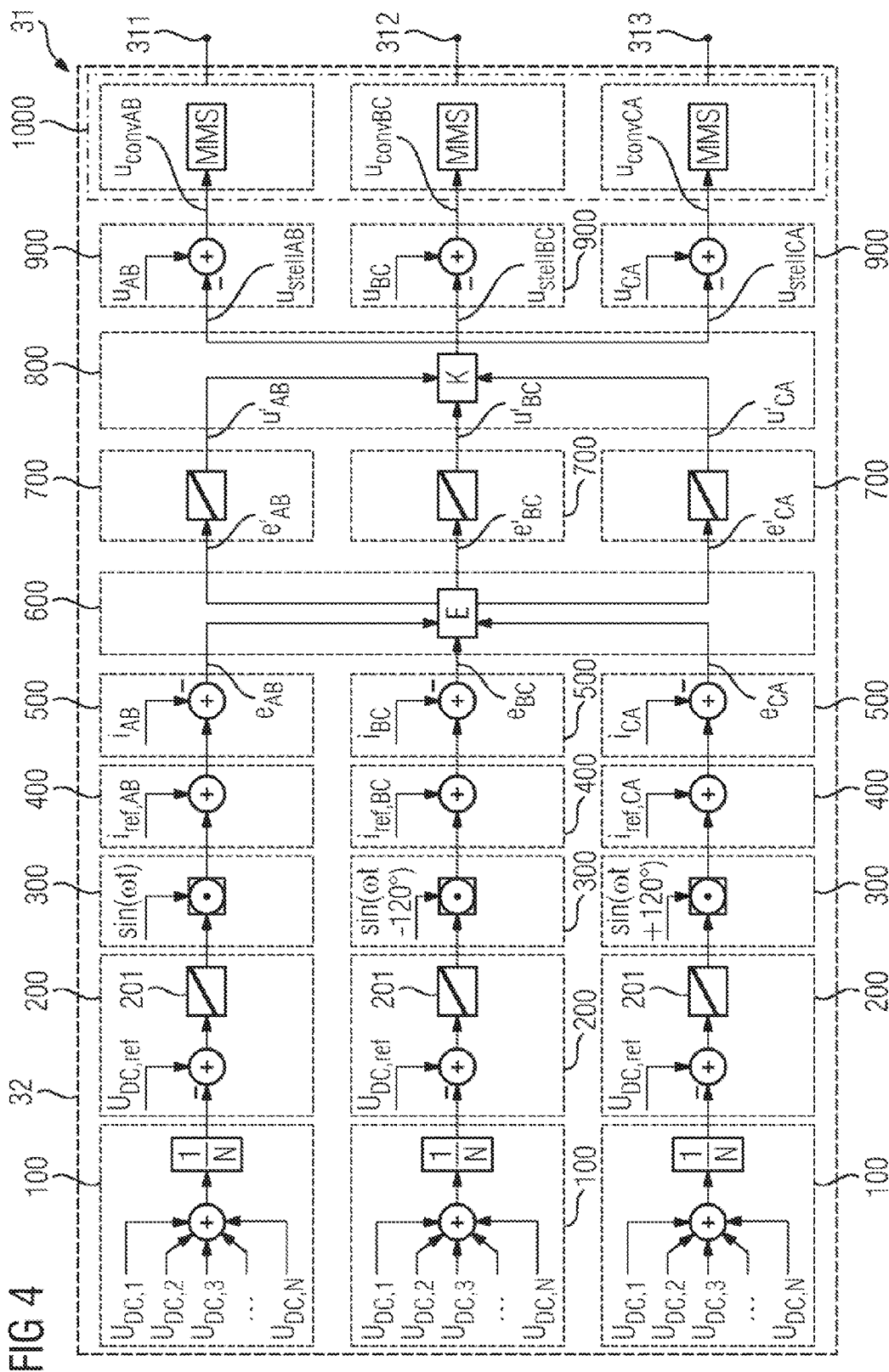
FIG. 4 shows an exemplary embodiment of a control device of the converter according to the invention.

FIG. 4 shows in detail the construction of an exemplary embodiment of a signal processing unit 32 of the control device 31 of the converter 10 from the exemplary embodiment of FIG. 1. For the sake of better understanding of the structure, the individual components of the signal processing unit 32 are divided in the form of blocks 100 to 1000. The control steps executing in the blocks 100 to 500 occur in parallel for the three phase modules 7, 8, 9 of the first, second and third phase branches 1, 2, 3. To avoid repetitions, these control steps are only described in detail below for the phase module 7 of the first phase branch 1. The voltages UDC1 to UDCN of the energy store 16 of the sub modules 8 of the phase module 7 are added in a mean value generator 100, and a mean value of these voltages is formed by dividing by the number N of the sub modules in the phase module. The difference between the mean value of the voltages determined in block 100 is compared in a difference generator 200 with a DC voltage set point value UDCREF and supplied to a voltage controller 201 that supplies a real set point current value to the output of the difference generator 200. The real set point current value determined is converted in a frequency generator 300 to an alternating current variable, in that the real set point current is generated from the real set point current value. The real set point current is an alternating current variable whose phase corresponds to the phase of the network voltage in the alternating voltage supply network. A predetermined reactive set point current irefAC for the phase module 7 is added by means of an adder 400 to the real set point current. It must be noted here that the predetermined reactive set point currents for the two other phase modules 8, 9, which are identified in FIG. 4 with irefBC and irefCA respectively, differ in general in their value and their temporal course from irefAB. The set point current calculated from the real set point current and the reactive set point current is compared in a unit 500 with a phase module current iAB measured by means of the current measuring unit 11, so forming a control difference eAB. The control differences eBC and eCA are correspondingly generated for the two phase modules 8, 9.

The control differences eAB, eBC and eCA are supplied to a decoupling unit 600. By means of the decoupling unit, the control differences are computationally decoupled, wherein the decoupling is taken into account in respect of the mutual dependence of the phase module currents resulting from the magnetic coupling in the choke pairs. The decoupling can be described mathematically as follows according to an exemplary embodiment. If x=(iconvAB, iconvBC, iconvCA) represents a vector of the phase module currents, and u=(uAB-uconvAB, uBC-uconvBC, uCA-uconvCA) represents a vector of the differences between the connection voltages and the voltages dropped across the phase modules, then the time derivative dx/dt of the phase module currents can be described by the equation $$dx/dt = M1*x + M2*u$$

The 3×3 matrices M1 and M2 in the above equation take the mutual dependence of the phase module currents resulting from the magnetic coupling in the choke pairs into account. Through a transformation T, the matrix M1 can be converted into diagonal form, so that the mutual dependencies of the phase module currents are computationally resolved, which is referred to here as decoupling. Due to the linearity of the system of mathematical equations, the transformation T can also be applied to the control differences eAB, eBC, eCA. In this case, decoupled control differences e'AB, e'BC, e'CA result from the decoupling. The decoupled control differences e'AB, e'BC, e'CA are supplied to the current controllers 700 that are arranged downstream of the decoupling unit 600. The current controllers 700 determine decoupled computer actuating variables u'AB, u'BC, u'CA from these. A coupling unit 800 arranged downstream of the current controllers 700 then calculates corrected actuating voltages ustellAB, ustellBC, ustellCA from the decoupled actuating variables, wherein the magnetic coupling in the choke pairs is taken into account again by the correction.

The decoupling can, for example, be carried out as follows:

$$e'AB = (-eAB + 2*eBC - eCA)/3,$$

$$e'BC = (-eAB - eBC + 2*eCA)/3,$$

$$e'CA = (eAB + eBC + eCA)/3.$$

The following then applies to the coupling:

$$ustellAB = (M-L)*u'AB + (M-L)*u'BC + (L+2*M)*u'CA,$$

$$ustellBC = (L-M)*u'AB + (L+2*M)*u'CA,$$

$$ustellCA = (L-M)*u'BC + (L+2*M)*u'CA,$$

where M represents the magnetic interaction between the chokes of one of the choke pairs, and L represents the value of inductance of the chokes of the choke pairs. M and L here are the same for all the choke pairs, because the choke pairs in this exemplary embodiment are implemented identically, which is not, however, in general necessary.

According to the exemplary embodiment illustrated in FIGS. 1 to 4, the corrected actuating voltages ustellAB, ustellBC, ustellCA have measured disturbing voltages impressed upon them in the units 900, which in this exemplary embodiment correspond to measured connection voltages uAB, uBC and uCA. Phase module voltages uconvAB, uconvBC, uconvCA that are to be set are obtained through this second correction. These are forwarded to the control unit 1000, wherein the control unit 1000 comprises so-called Module Management Systems (MMS). By means of the MMS, the phase module voltages that are to be set are converted into control signals for the sub modules 8. The control signals are supplied to the sub modules by means of the control outputs 311, 312, 313.

Figure 5:
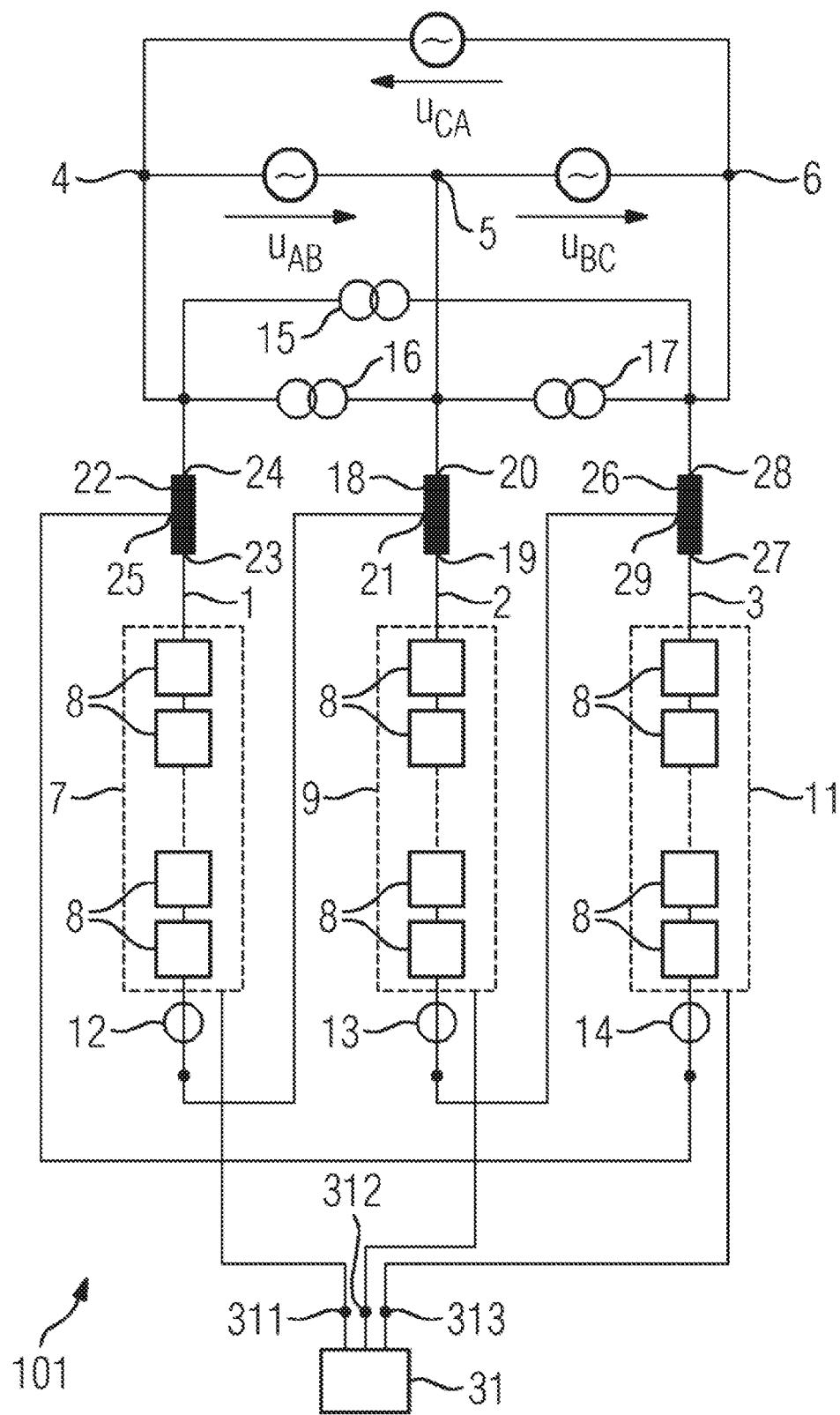
FIG. 5 shows a schematic representation of a second exemplary embodiment of a converter according to the invention.

A second exemplary embodiment of a converter 101 according to the invention is illustrated in FIG. 5. Parts that are the same or similar are given the same reference codes in FIGS. 1 and 5. To avoid repetitions, only the differences between the exemplary forms of embodiment of FIG. 1 and FIG. 5 will be considered in the description of FIG. 5. The sub modules 8 of the converter 20 also have the same construction, and correspond to the sub modules 8 of FIG. 2. This also applies correspondingly to a third exemplary embodiment of a converter 102 according to the invention illustrated in FIG. 6.

Figure 6:
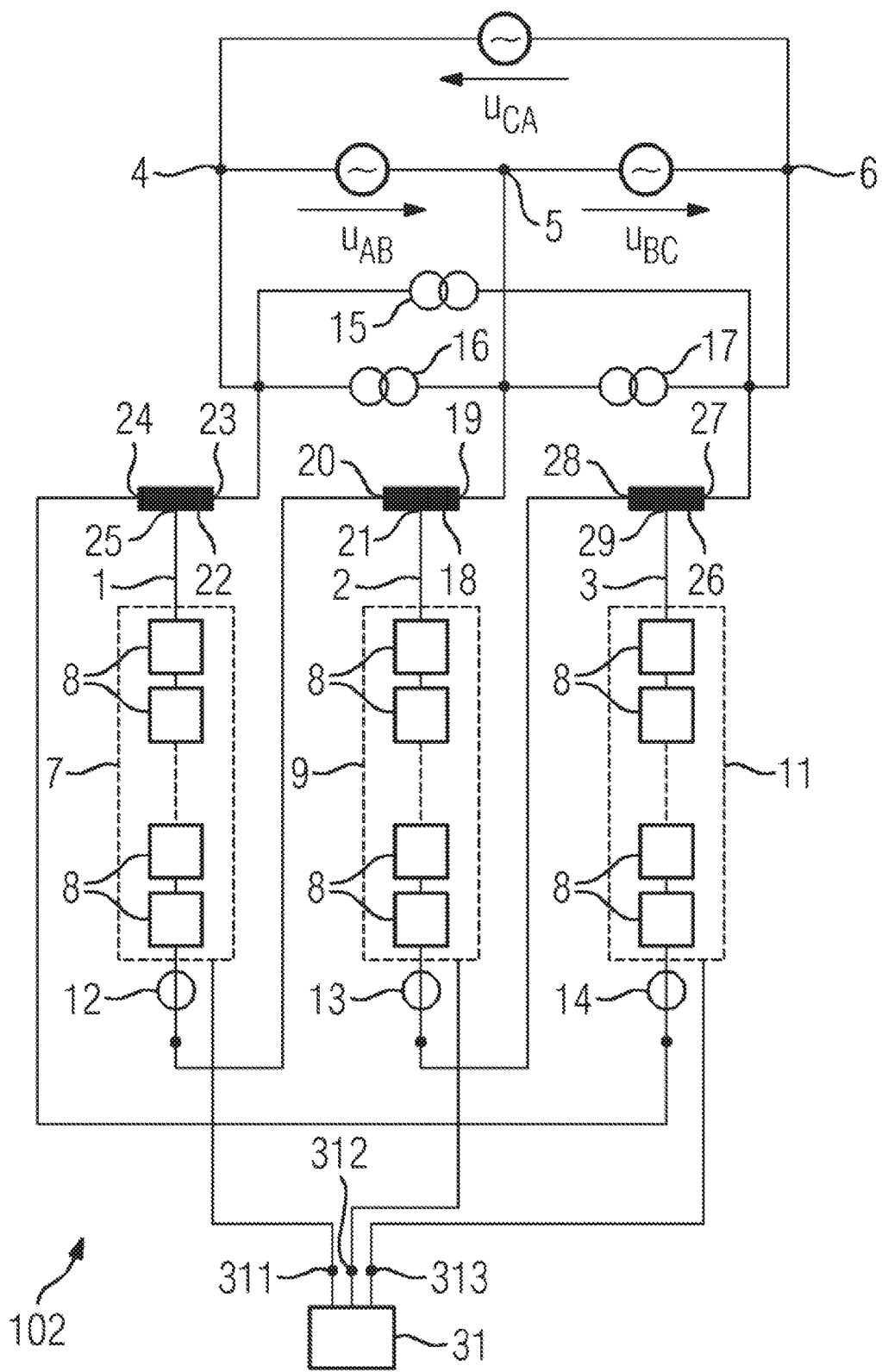
FIG. 6 shows a schematic representation of a third exemplary embodiment of a converter according to the invention.

FIGS. 5 and 6 illustrate in particular two further possibilities for the arrangement of the choke pairs 18, 22 and 26.

In FIG. 5, the end connection 24 of the first choke pair 22 is connected to the connection point 4. The center connection 25 is connected to the third phase branch 3. The end connection 23 is connected to the first phase branch 1. The end connection 20 of the second choke pair 18 is connected to the connection point 5. The center connection 21 is connected to the first phase branch 1. The end connection 19 is connected to the second phase branch 2. The end connection 28 of the third choke pair 26 is connected to the connection point 6. The center connection 29 is connected to the second phase branch 2. The end connection 27 is connected to the third phase branch 3.

In FIG. 6, the end connection 23 of the first choke pair 22 is connected to the connection point 4. The center connection 25 is connected to the first phase branch 1. The end connection 24 is connected to the third phase branch 3. The end connection 19 of the second choke pair 18 is connected to the connection point 5. The center connection 21 is connected to the second phase branch 2. The end connection 20 is connected to the first phase branch 1. The end connection 27 of the third choke pair 26 is connected to the connection point 6. The center connection 29 is connected to the third phase branch 3. The end connection 26 is connected to the second phase branch 2.

The converters 101, 102 of FIGS. 5 and 6 are controlled correspondingly by means of the control device 31 illustrated in FIG. 4. The decoupling and coupling described there differ, however, through the use of different transformations M1, M2, T. The transformations here take the different coupling in the choke pairs into account.

LIST OF REFERENCE CODES 1, 2, 3 Phase branch
4, 5, 6 Connection point
7, 9, 11 Phase module
8 Sub module
81 Power semiconductor switching unit
82 Capacitor
10 Converter
12, 13, 14 Measuring apparatus
15, 16, 17 Measuring apparatus
18, 22, 26 Choke pair
19, 20, 21 Connection
23, 24, 25 Connection
27, 28, 29 Connection
221, 222 Winding
223 Coil core
31 Control device
311, 312, 313 Control outputs
32 Signal processing unit
100 Mean value generator
200 Difference generator
300 Frequency generator
400 Adder
500 Unit
600 Decoupling unit
700 Current controller
800 Coupling unit
900 Unit
1000 Control unit
X1, X2 Connection of the sub module
UDC1 . . . UDCN Energy storage voltage
UDCREF DC voltage set point value
irefAB, irefBC, irefCA Reactive set point current
iAB, iBC, iCA Phase module current
eAB, eBC, eCA Control difference
e'AB, e'BC, e'CA Decoupled control difference
u'AB, u'BC, u'CA Computer actuating variable
ustellAB, ustellBC, ustellCA Corrected actuating voltage
uconvAB, uconvBC, uconvCA Voltage to be set
MMS Module Management System

The invention claimed is:

1. A converter for outputting reactive power, the converter comprising:
coupling inductances;
magnetically coupled choke pairs including a magnetically coupled first choke pair;
three phase branches including a first phase branch, a second phase branch and a third phase branch, said three phase branches can each be connected to an associated phase of an alternating voltage supply network, and are delta-connected to one another, each of said phase branches comprising a phase module with a series circuit of two-pole sub modules, each of said two-pole sub modules having an energy storage device, poles, at least one power semiconductor, and can be controlled in such a way that at least one positive or at least one negative sub module voltage, or a voltage with a value zero, is created across said poles of a respective two-pole sub module, and a voltage across each said phase module corresponds to a sum of sub module voltages across said two-pole sub modules, wherein said second and the third phase branches are connected to phases of the alternating voltage supply network assigned to them by means of said coupling inductances, and said first and said third phase branches are electrically connected together by said magnetically coupled first choke pair having a first and a second end connection as well as a center connection, wherein said three connections of said magnetically coupled first choke pair are connected in an arbitrary combination with said first phase branch, said third phase branch and with a phase of the alternating voltage supply network that is assigned to said first phase branch;
a control device for controlling phase module currents, said control device containing:
current controllers assigned to said phase modules;
a decoupling unit disposed upstream of said current controllers for computationally decoupling control differences during control of the phase module currents in respect of a mutual dependence of the phase module currents on account of a magnetic coupling in said magnetically coupled first choke pair, in such a way that decoupled computational actuating variables can be derived from decoupled control differences by means of one of said current controllers;
a coupling unit disposed downstream of said current controllers for correcting the decoupled computational actuating variables in accordance with the magnetic coupling of said magnetically coupled first choke pair so as to obtain corrected actuating voltages; and
a control unit for driving said sub modules, so that voltages across said phase modules can be adjusted in such a way that the voltages correspond to the corrected actuating voltages.

2. The converter according to claim 1, wherein:
said magnetically coupled choke pairs include a second magnetically coupled choke pair formed from said coupling inductances assigned to said second phase branch and from a further inductance, and connects said first and said second phase branches together, said magnetically coupled second choke pair has a first and a second end connection and a center connection, said three connections of said magnetically coupled second choke pair are joined in an arbitrary combination with said first phase branch, said second phase branch, or with a phase of the alternating voltage supply network that is assigned to said second phase branch;

said magnetically coupled choke pairs include a third magnetically coupled choke pair formed from said coupling inductances assigned to said third phase branch and from an additional inductance, and connects said second and said third phase branches together, said magnetically coupled third choke pair has a first and a second end connection and a center connection, said three connections of said magnetically coupled third choke pair are joined in an arbitrary combination with said second phase branch, said third phase branch, or with the phase of the alternating voltage supply network that is assigned to said third phase branch;

said decoupling unit is additionally configured to computationally decouple the control differences in respect of a mutual dependence of the phase module currents resulting from the magnetic coupling in said magnetically coupled second and third choke pairs; and said coupling unit is configured for correction of the decoupled computational actuating variables obtained by means of said current controller from the decoupled control differences in accordance with the magnetic coupling in said magnetically coupled first, second and third choke pairs so as to obtain the corrected actuating voltages.

3. The converter according to claim 1, wherein said sub modules are constructed as full-bridge circuits, and the sub module voltage corresponds to an energy store voltage.

4. The converter according to claim 1, wherein said energy storage device is a storage capacitor.

5. The converter according to claim 1, wherein said control unit is configured for driving said sub modules by means of pulse-width modulation.

6. The converter according to claim 1, further comprising measuring apparatuses for detecting the phase module currents and connection voltages dropped across said phase branches.

7. The converter according to claim 1, wherein:
said control device further comprises a signal processing unit assigned to said phase modules with a mean value generator, a difference generator, a voltage controller, a frequency generator and an adder;
in said signal processing unit said mean value generator is configured to generate a mean value of energy store voltages of an assigned phase module;
said difference generator is connected on an input side to an output of said mean value generator, and is configured to generate a control difference from the mean value of the energy store voltages and a predetermined DC voltage set point value;
said voltage controller is connected on an input side to an output of said difference generator, and is configured to generate a real set point current value from the control difference;
said frequency generator is connected on an input side to an output of said voltage controller, and is configured to generate a sinusoidal real set point current from the real set point current value; and
said adder is connected on an input side to an output of said frequency generator, and is configured to generate a set point current for the assigned phase module from the real set point current and a predefined reactive set point current.

8. A method for controlling a converter for outputting reactive power, the converter having three phase branches including a first, a second and a third phase branch, wherein the three phase branches can each be connected to an associated phase of an alternating voltage supply network, and are delta-connected to one another, wherein each of the phase branches contains a phase module with a series circuit of two-pole sub modules, wherein each sub module has an energy storage device and at least one power semiconductor, and can be driven in such a way that at least one positive or at least one negative sub module voltage, or a voltage with a zero value, is dropped across poles of the sub module, and a voltage dropped across each phase module corresponds to a sum of sub module voltages dropped across the sub modules, wherein the second and the third phase branches are connected to phases of the alternating voltage supply network assigned to them by means of coupling inductances, and the first and the third phase branches are connected together by a magnetically coupled first choke pair having a first and a second end connection as well as a center connection, wherein the three connections of the magnetically coupled first choke pair are joined in an arbitrary combination with the first phase branch, the third phase branch, and with the phase of the alternating voltage supply network that is assigned to the first phase branch, which comprises the steps of:
predetermining a set point current for each of the phase modules;
by means of a decoupling unit control differences, that are formed from predetermined set point currents and measured phase module currents, in respect of a mutual dependence of phase module currents on account of a magnetic coupling in the magnetically coupled first choke pair, are computationally decoupled in such a way that current controllers disposed downstream from the decoupling unit assigned to the phase modules each derive decoupled computational actuating variables from decoupled control differences;
correcting the decoupled computational actuating variables by means of a coupling unit which is disposed downstream of the current controllers in accordance with the magnetic coupling of the magnetically coupled first choke pair so as to obtain corrected actuating voltages; and
driving the sub modules of the phase modules by means of a control unit in such a way that the voltages dropped across the phase modules correspond to the corrected actuating voltages.

9. The method according to claim 8, which further comprises:
providing a second magnetically coupled choke pair, formed from the coupling inductance assigned to the second phase branch and from a further inductance, and connects the first and the second phase branches together, wherein the magnetically coupled second choke pair has a first and a second end connection and a center connection, wherein the three connections of the magnetically coupled second choke pair are joined in an arbitrary combination with the first phase branch, the second phase branch, or with the phase of the alternating voltage supply network that is assigned to the second phase branch;
providing a third magnetically coupled choke pair, formed from the coupling inductance assigned to the third phase branch and from an additional inductance, and connects the second and the third phase branches together, wherein the third magnetically coupled choke pair has a first and a second end connection and a center connection, wherein the three connections of the third magnetically coupled choke pair are joined in an arbitrary combination with the second phase branch, the third phase branch, or with the phase of the alternating voltage supply network that is assigned to the third phase branch, wherein by means of the decoupling unit the control differences in respect of a mutual dependence of the phase module currents on account of the magnetic coupling in the first, second and third choke pairs are computationally decoupled in such a way that the current controllers disposed downstream from the decoupling unit assigned to the phase modules each derive the decoupled computational actuating variables from the decoupled control differences; and correcting the decoupled computational actuating variables by means of a coupling unit disposed downstream from the current controllers in accordance with the magnetic coupling of the first, second and third choke pairs to obtain corrected actuating voltages.

10. The method according to claim 8, wherein the corrected actuating voltages each have a disturbing voltage impressed upon them, wherein the disturbing voltages are determined depending on connection voltages dropped across the phase branches, and the corrected actuating voltages onto which the disturbing voltages have been impressed are supplied to the control unit.

11. The method according to claim 8, which further comprises converting the actuating voltages by means of pulse-width modulation into control signals for driving the assigned sub modules.

12. The method according to claim 8, wherein the set point currents are each composed of a real set point current and a reactive set point current, wherein the real set point currents are determined depending on a mean value of the voltages dropped across the sub modules of the associated phase module and of a predetermined DC voltage set point value.

* * * * *